(12) United States Patent
Terwillegar et al.

(10) Patent No.: US 11,952,458 B2
(45) Date of Patent: Apr. 9, 2024

(54) POLYESTER IMPACT MODIFIERS

(71) Applicant: Danimer IPCo, LLC, Bainbridge, GA (US)

(72) Inventors: Arne Matthew Terwillegar, Watkinsville, GA (US); Karson Durie, Athens, GA (US); Mangaldeep Kundu, Athens, GA (US)

(73) Assignee: Danimer IPCo, LLC, Bainbridge, GA (US)

( * ) Notice: Subject to any disclaimer, the term of this patent is extended or adjusted under 35 U.S.C. 154(b) by 81 days.

(21) Appl. No.: 17/744,109

(22) Filed: May 13, 2022

(65) Prior Publication Data
US 2022/0363818 A1  Nov. 17, 2022

Related U.S. Application Data

(60) Provisional application No. 63/188,668, filed on May 14, 2021.

(51) Int. Cl.
| | |
|---|---|
| *C08G 63/42* | (2006.01) |
| *C08G 63/553* | (2006.01) |
| *C08G 63/672* | (2006.01) |
| *C08L 67/02* | (2006.01) |

(52) U.S. Cl.
CPC .......... *C08G 63/42* (2013.01); *C08G 63/553* (2013.01); *C08L 67/02* (2013.01); *C08G 63/672* (2013.01); *C08L 2205/025* (2013.01); *C08L 2205/03* (2013.01)

(58) Field of Classification Search
CPC .... C08G 63/42; C08G 63/553; C08G 63/672; C08L 67/02; C08L 2205/025; C08L 2205/03; C08L 67/04
See application file for complete search history.

(56) References Cited

U.S. PATENT DOCUMENTS

| | | | | |
|---|---|---|---|---|
| 6,018,004 | A | * | 1/2000 | Warzelhan .............. C08L 75/06 528/304 |
| 8,466,233 | B2 | | 6/2013 | Kimura et al. |
| 8,993,676 | B2 | * | 3/2015 | Park ........................ C08L 67/02 525/173 |
| 9,850,370 | B2 | | 12/2017 | Georgelos et al. |
| 10,100,191 | B2 | | 10/2018 | Tachinami et al. |
| 2011/0189414 | A1 | * | 8/2011 | Whitehouse ......... C08K 5/0083 521/138 |
| 2013/0295306 | A1 | * | 11/2013 | Kim ..................... C08K 5/1345 524/335 |
| 2014/0288241 | A1 | | 9/2014 | Park et al. |
| 2017/0166740 | A1 | | 6/2017 | Weinlein et al. |
| 2019/0315915 | A1 | | 10/2019 | Peña et al. |

* cited by examiner

*Primary Examiner* — Marc S Zimmer
*Assistant Examiner* — Surbhi M Du
(74) *Attorney, Agent, or Firm* — Luedeka Neely, P.C.

(57) ABSTRACT

A polyester is disclosed which is made up of: (1) from about 15 to about 40 weight percent monomer repeat units of isosorbide; (2) from about 25 to about 60 weight percent monomer repeat units of a dicarboxylic acid or anhydride such as succinic acid or anhydride; and (3) from about 10 to about 20 weight percent monomer repeat units of a polyhydric alcohol such as 1,3-propanediol. In some instances, the polymer may also include monomer repeat units of methyl nadic anhydride or nadic anhydride. A polymer composition is also disclosed, which includes the polyester as well as a biodegradable polymer selected from the group consisting of poly(lactic acid), poly(hydroxyalkanoates), and mixtures thereof.

30 Claims, No Drawings

POLYESTER IMPACT MODIFIERS

FIELD

This disclosure relates to polyesters suitable for use as impact modifiers and to biodegradable polymeric compositions incorporating such impact modifiers.

BACKGROUND

For decades, petroleum-based polymers such as polyethylene (PE), polypropylene (PP), or polyethylene terephthalate (PET) have been used for a wide variety of applications. While these polymers may provide good strength, barrier, and/or printability characteristics, unfortunately, such polymers do not readily degrade or decompose after disposal—either in landfills or by home composting techniques. Thus, films, bags, and other materials made from such polymers may exist in landfills for centuries after disposal.

Consequently, there is an increasing demand for alternative polymers which may be biosourced, biodegradable, and/or compostable. Examples of such polymers include poly(lactic acid) and poly(hydroxyalkanoates). While these biopolymers offer clear advantages in biodegradability and/or compostability, it is typically desirable to blend various additives with the biopolymers to improve the physical properties of the biopolymers.

If the additives blended into the biopolymers are not biodegradable and/or not compostable, then the biopolymer's environmental benefits are reduced. Consequently, it would be desirable to provide additives for use with biopolymers, such as incorporating poly(lactic acid) and poly(hydroxyalkanoates), which are themselves biodegradable and/or compostable.

SUMMARY OF THE INVENTION

The above and other needs are met by a compostable polyester according to the present disclosure.

In a first aspect, the present disclosure provides a polyester. According to certain embodiments, this polyester is made up of: (1) from about 15 to about 40 weight percent monomer repeat units of isosorbide; (2) from about 25 to about 60 weight percent monomer repeat units of a dicarboxylic acid or anhydride; and (3) from about 10 to about 20 weight percent monomer repeat units of a polyhydric alcohol. All of these weight percentages are based on the total weight on the polyester.

The polyester also has a weight average molecular weight of at least 8000 Daltons, as determined by ASTM D5296-05. More preferably, the polyester has a weight average molecular weight from about 10,000 to about 15,000 Daltons, as determined by ASTM D5296-05.

In certain embodiments, the dicarboxylic acid or anhydride is preferably selected from the group consisting of succinic acid, succinic anhydride, glutaric acid, pimelic acid, undecanoic acid, dodecanoic acid, dodecanedioic acid, suberic acid, azelaic acid, sebacic acid, adipic acid, phthalic anhydride, dimethyl terephthalate, terephthalic acid, isophthalic acid, 1,8-naphthalic anhydride, 1,8-naphthalic dicarboxylic acid, 1,8-dimethyl naphthalate, dimethyl isophthalate, phthalic acid, pyromellitic anhydride, mellitic anhydride, mellitic acid, trimellitic anhydride, 3,3'4,4'-benzophenone tetracarboxylic anhydride, 3,3'4,4'-benzophenone tetracarboxylic acid, trimellitic acid, nadic anhydride, methyl nadic anhydride, C36 dimer acid, partially hydrogenated C36 dimer acid, polyethylene terephthalate recycled polymer, polybutylene terephthalate recycled polymer, polyethylene terephthalate virgin polymer, polybutylene terephthalate virgin polymer, and mixtures thereof.

More preferably, the dicarboxylic acid or anhydride is selected from the group consisting of succinic acid, succinic anhydride, nadic anhydride, methyl nadic anhydride, sebacic acid, C36 dimer acid, partially hydrogenated C36 dimer acid, and mixtures thereof.

In a particularly preferred embodiment, the dicarboxylic acid or anhydride is made up of a mixture of (1) succinic acid or succinic anhydride and (2) nadic anhydride, methyl nadic anhydride, C36 dimer acid, or partially hydrogenated C36 dimer acid, and mixtures thereof. For this embodiment, the polyester is preferably from about 25 to about 35 weight percent succinic acid or succinic anhydride and from about 10 to about 25 weight percent nadic anhydride, methyl nadic anhydride, C36 dimer acid, or partially hydrogenated C36 dimer acid.

In some embodiments, the polyhydric alcohol is preferably selected from the group consisting of glycerin, ethylene glycol, diethylene glycol, 1,3-propanediol, 1,4-butanediol, 1,5-pentanediol, 1,6-hexanediol, 2-methyl, neopentyl glycol, propylene glycol, triethylene glycol, tetraethylene glycol, propylene glycol, dipropylene glycol, tripropylene glycol, tetrapropylene glycol, trimethylene glycol, 1,1,1-trimethylol ethane, 1,2,3-trimethylolpropane, methyl propanediol, pentaerythritol, and poly(oxyalkylene) polyols comprising monomer repeat units of ethylene oxide, propylene oxide, or butylene oxide, and mixtures thereof.

More preferably, the polyhydric alcohol is selected from the group consisting of 1,3-propanediol, 1,4-butanediol, 1,6-hexanediol, methyl propanediol, and mixtures thereof. Even more preferably, the polyhydric alcohol includes 1,3-propanediol.

In some instances, the dicarboxylic acid or anhydride preferably includes succinic acid or anhydride, and the polyhydric alcohol preferably includes 1,3-propanediol.

In an alternative embodiment, the isosorbide may be omitted from the polyester. In such instances, the polyester is made up of: (1) from about 35 to about 65 weight percent monomer repeat units of a dicarboxylic acid or anhydride selected from the group consisting of the dicarboxylic acid or anhydride is selected from the group consisting of succinic acid, succinic anhydride, nadic anhydride, methyl nadic anhydride, sebacic acid, C36 dimer acid, partially hydrogenated C36 dimer acid, and mixtures thereof; and (2) from about 35 to about 65 weight percent monomer repeat units of a polyhydric alcohol.

In a preferred embodiment, the dicarboxylic acid or anhydride is made up of a mixture of (1) succinic acid or succinic anhydride and (2) nadic anhydride, methyl nadic anhydride, C36 dimer acid, or partially hydrogenated C36 dimer acid, and mixtures thereof. For this embodiment, the polyester is preferably from about 30 to about 40 weight percent succinic acid or succinic anhydride and from about 10 to about 20 weight percent nadic anhydride, methyl nadic anhydride, C36 dimer acid, or partially hydrogenated C36 dimer acid.

Suitable polyhydric alcohols for this alternative polyester are the same as the polyhydric alcohols noted above for the polyester, including the isosorbide. Also, for the alternative polyester, the weight average molecular weight of the polyester is at least 8000 Daltons, as determined by ASTM D5296-05. More preferably, the polyester has a weight average molecular weight from about 10,000 to about 15,000 Daltons, as determined by ASTM D5296-05.

In a second aspect, the present disclosure provides a polymer composition. The polymer composition typically includes from about 50 to about 95 weight percent of a biodegradable polymer selected from the group consisting of poly(lactic acid), poly(hydroxyalkanoates), and mixtures thereof. The polymer composition also includes from about 5 to about 50 weight percent of an impact modifying polyester. The impact modifying polyester, in turn, is made up of: (1) from about 15 to about 40 weight percent monomer repeat units of isosorbide, based on the total weight of the polyester; (2) from about 25 to about 60 weight percent monomer repeat units of a dicarboxylic acid or anhydride, based on the total weight of the polyester; and (3) from about 10 to about 20 weight percent monomer repeat units of a polyhydric alcohol, based on the total weight of the polyester. The impact modifying polyester also has a weight average molecular weight of at least 8000 Daltons, as determined by ASTM D5296-05.

In certain embodiments, the dicarboxylic acid or anhydride is preferably selected from the group consisting of succinic acid, succinic anhydride, glutaric acid, pimelic acid, undecanoic acid, dodecanoic acid, dodecanedioic acid, suberic acid, azelaic acid, sebacic acid, adipic acid, phthalic anhydride, dimethyl terephthalate, terephthalic acid, isophthalic acid, 1,8-naphthalic anhydride, 1,8-naphthalic dicarboxylic acid, 1,8-dimethyl naphthalate, dimethyl isophthalate, phthalic acid, pyromellitic anhydride, mellitic anhydride, mellitic acid, trimellitic anhydride, 3,3'4,4'-benzophenone tetracarboxylic anhydride, 3,3'4, 4'-benzophenone tetracarboxylic acid, trimellitic acid, nadic anhydride, methyl nadic anhydride, C36 dimer acid, partially hydrogenated C36 dimer acid, polyethylene terephthalate recycled polymer, polybutylene terephthalate recycled polymer, polyethylene terephthalate virgin polymer, polybutylene terephthalate virgin polymer, and mixtures thereof.

More preferably, the dicarboxylic acid or anhydride is selected from the group consisting of succinic acid, succinic anhydride, nadic anhydride, methyl nadic anhydride, sebacic acid, C36 dimer acid, partially hydrogenated C36 dimer acid, and mixtures thereof.

In a particularly preferred embodiment, the dicarboxylic acid or anhydride is made up of a mixture of (1) succinic acid or succinic anhydride and (2) nadic anhydride, methyl nadic anhydride, C36 dimer acid, or partially hydrogenated C36 dimer acid, and mixtures thereof. For this embodiment, the polyester is preferably from about 25 to about 35 weight percent succinic acid or succinic anhydride and from about 10 to about 25 weight percent nadic anhydride, methyl nadic anhydride, C36 dimer acid, or partially hydrogenated C36 dimer acid.

In some embodiments, the polyhydric alcohol is preferably selected from the group consisting of glycerin, ethylene glycol, diethylene glycol, 1,3-propanediol, 1,4-butanediol, 1,5-pentanediol, 1,6-hexanediol, 2-methyl, neopentyl glycol, propylene glycol, triethylene glycol, tetraethylene glycol, propylene glycol, dipropylene glycol, tripropylene glycol, tetrapropylene glycol, trimethylene glycol, 1,1,1-trimethylol ethane, 1,2,3-trimethylolpropane, methyl propanediol, pentaerythritol, and poly(oxyalkylene) polyols comprising monomer repeat units of ethylene oxide, propylene oxide, or butylene oxide, and mixtures thereof.

More preferably, the polyhydric alcohol is selected from the group consisting of 1,3-propanediol, 1,4-butanediol, 1,6-hexanediol, methyl propanediol, and mixtures thereof. Even more preferably, the polyhydric alcohol includes 1,3-propanediol.

In some instances, the dicarboxylic acid or anhydride preferably includes succinic acid or anhydride, and the polyhydric alcohol preferably includes 1,3-propanediol.

According to certain embodiments, the polymer composition more preferably includes from about 60 to about 85 weight percent of the biodegradable polymer and from about 5 to about 30 weight percent of the impact modifying polyester. Even more preferably, the polymer composition includes from about 7.5 to about 15 weight percent of the impact modifying polyester.

In some instances, the biodegradable polymer preferably includes poly(lactic acid). In other embodiments, the biodegradable polymer preferably includes at least one poly(hydroxyalkanoate). In some embodiments, the biodegradable polymer preferably includes a mixture of poly(lactic acid) and poly(hydroxyalkanoates). For instance, in some embodiments, the polymer composition may include from about 5 to about 25 weight percent of poly(lactic acid) and from about 70 to about 90 weight percent of at least one poly(hydroxyalkanoate), based on the total weight of the polymer composition.

According to certain embodiments wherein the polymer composition includes a poly(hydroxyalkanoate), the at least one poly(hydroxyalkanoate) is preferably made up of poly-3-hydroxybutyrate-co-3-hydroxyhexanoate ("P(3HB-co-3HHx)").

In some instances, this (3HB-co-3HHx) is preferably made up of from about 75 to about 99 mole percent hydroxybutyrate and from about 1 to about 25 mole percent hydroxyhexanoate. More preferably, the (3HB-co-3HHx) is made up of from about 93 to about 98 mole percent hydroxybutyrate and from about 2 to about 7 mole percent hydroxyhexanoate.

In still other embodiments, the at least one poly(hydroxyalkanoate) may include a terpolymer made up from about 75 to about 99.9 mole percent monomer repeat units of 3-hydroxybutyrate, from about 0.1 to about 25 mole percent monomer repeat units of 3-hydroxyhexanoate, and from about 0.1 to about 25 mole percent monomer repeat units of a third 3-hydoxyalkanoate having from 5 to 12 carbon atoms.

According to certain embodiments the at least one poly(hydroxyalkanoate) preferably has a weight average molecular weight from about 50,000 Daltons to about 2.5 million Daltons, as determined by ASTM D5296-05. More preferably, the at least one poly(hydroxyalkanoate) has a weight average molecular weight from about 500,000 Daltons to about 750,000 Daltons, as determined by ASTM D5296-05.

The polymer composition may also include further additives. In some embodiments, the polymer compositions may also include from about 1 to about 10 weight percent of at least one plasticizer; from about 0.1 to about 5 weight percent of at least one nucleating agent; and from about 0.1 to about 10 weight percent of a filler.

In some instances, the polymer composition may include an additional biodegradable polymer besides poly(lactic acid) and/or poly(hydroxyalkanoates). Thus, in certain embodiments, the polymer composition may also include comprising from about 5 to about 50 weight percent of at least one biodegradable polymer selected from the group consisting of poly(caprolactone), poly(ethylene sebacate), poly(butylene succinate), poly(butylene succinate-co-adipate), poly(butylene adipate terephthalate), poly(vinyl acetate) and mixtures thereof.

According to certain embodiments, the polymer composition is preferably biodegradable as determined using ASTM standard D5988. Further, in some embodiments, the polymer composition is preferably home compostable as determined using ASTM standard D6868.

The present disclosure also provides various end-use products which may be formed from the aforementioned polymer composition. Thus, according to one embodiment, the present disclosure provides a molded sheet made up of the polymer composition. In a second embodiment, the present disclosure provides a molded article made up of the polymer composition, wherein the molded article is formed by thermoforming, injection molding, or blow molding. In another embodiment, the present disclosure provides a film made up of the polymer composition, wherein the film is a blown film or a cast film. In still another embodiment, the present disclosure provides a fiber made up of the polymer composition.

DETAILED DESCRIPTION

The present disclosure first provides novel polyesters which are suitable for use as impact modifiers in biodegradable and/or compostable polymer compositions.

In general, the polyester is made up of at least three different types of monomer repeat units, which are derived from: (1) isosorbide; (2) succinic acid or anhydride; and (3) 1,3-propanediol. In terms of amounts, the polyester is typically made up of: (1) from about 15 to about 40 weight percent monomer repeat units of isosorbide; (2) from about 25 to about 60 weight percent monomer repeat units of a dicarboxylic acid or anhydride; and (3) from about 10 to about 20 weight percent monomer repeat units of a polyhydric alcohol.

A variety of dicarboxylic acids and anhydrides are believed to be suitable for use in the preparation of the polyester. For example, the dicarboxylic acid or anhydride may be suitably selected from the group consisting of succinic acid, succinic anhydride, glutaric acid, pimelic acid, undecanoic acid, dodecanoic acid, dodecanedioic acid, suberic acid, azelaic acid, sebacic acid, adipic acid, phthalic anhydride, dimethyl terephthalate, terephthalic acid, isophthalic acid, 1,8-naphthalic anhydride, 1,8-naphthalic dicarboxylic acid, 1,8-dimethyl naphthalate, dimethyl isophthalate, phthalic acid, pyromellitic anhydride, mellitic anhydride, mellitic acid, trimellitic anhydride, 3,3'4,4'-benzophenone tetracarboxylic anhydride, 3,3'4,4'-benzophenone tetracarboxylic acid, trimellitic acid, nadic anhydride, methyl nadic anhydride, C36 dimer acid, partially hydrogenated C36 dimer acid, polyethylene terephthalate recycled polymer, polybutylene terephthalate recycled polymer, polyethylene terephthalate virgin polymer, polybutylene terephthalate virgin polymer, and mixtures thereof.

More preferably, the dicarboxylic acid or anhydride is selected from the group consisting of succinic acid, succinic anhydride, nadic anhydride, methyl nadic anhydride, sebacic acid, C36 dimer acid, partially hydrogenated C36 dimer acid, and mixtures thereof.

In a particularly preferred embodiment, the dicarboxylic acid or anhydride is made up of a mixture of (1) succinic acid or succinic anhydride and (2) nadic anhydride, methyl nadic anhydride, C36 dimer acid, or partially hydrogenated C36 dimer acid, and mixtures thereof. For this embodiment, the polyester is preferably from about 25 to about 35 weight percent succinic acid or succinic anhydride and from about 10 to about 25 weight percent nadic anhydride, methyl nadic anhydride, C36 dimer acid, or partially hydrogenated C36 dimer acid.

A range of polyhydric alcohols is also believed to be suitable for the polyester. Examples of suitable polyhydric alcohols may be selected from the group consisting of glycerin, ethylene glycol, diethylene glycol, 1,3-propanediol, 1,4-butanediol, 1,5-pentanediol, 1,6-hexanediol, 2-methyl, neopentyl glycol, propylene glycol, triethylene glycol, tetraethylene glycol, propylene glycol, dipropylene glycol, tripropylene glycol, tetrapropylene glycol, trimethylene glycol, 1,1,1-trimethylol ethane, 1,2,3-trimethylolpropane, methyl propanediol, pentaerythritol, and poly(oxyalkylene) polyols comprising monomer repeat units of ethylene oxide, propylene oxide, or butylene oxide, and mixtures thereof.

More preferably, the polyhydric alcohol is selected from the group consisting of 1,3-propanediol, 1,4-butanediol, 1,6-hexanediol, methyl propanediol, and mixtures thereof. Still more preferably, the polyhydric alcohol comprises 1,3-propanediol.

In a particularly preferred embodiment, the dicarboxylic acid or anhydride preferably comprises succinic acid or anhydride, and the polyhydric alcohol preferably comprises 1,3-propanediol.

The polyester also has a weight average molecular weight of at least 8000 Daltons, as determined by ASTM D5296-05. More preferably, the polyester has a weight average molecular weight from about 10,000 to about 15,000 Daltons, as determined by ASTM D5296-05.

In general, the polyesters may be prepared by charging isosorbide to a reaction flask or other reactor, complete with a nitrogen inlet, vacuum capability, heating, and agitation. First, the isosorbide is melted and then vacuum degassed as a molten mass. Subsequently, diacids are added, and the contents of the flask are reacted at temperatures of up to 220° C. until water evolution slows, at which time all remaining glycols are charged. Esterification is completed at temperatures of up to 220° C. and vacuum pressures as low as 3.3 kPa.

In an alternative embodiment, the isosorbide may be omitted from the polyester. In such instances, the polyester is made up of: (1) from about 35 to about 65 weight percent monomer repeat units of a dicarboxylic acid or anhydride selected from the group consisting of the dicarboxylic acid or anhydride is selected from the group consisting of succinic acid, succinic anhydride, nadic anhydride, methyl nadic anhydride, sebacic acid, C36 dimer acid, partially hydrogenated C36 dimer acid, and mixtures thereof; and (2) from about 35 to about 65 weight percent monomer repeat units of a polyhydric alcohol.

In a preferred embodiment, the dicarboxylic acid or anhydride is made up of a mixture of (1) succinic acid or succinic anhydride and (2) nadic anhydride, methyl nadic anhydride, C36 dimer acid, or partially hydrogenated C36 dimer acid, and mixtures thereof. For this embodiment, the polyester is preferably from about 30 to about 40 weight percent succinic acid or succinic anhydride and from about 10 to about 20 weight percent nadic anhydride, methyl nadic anhydride, C36 dimer acid, or partially hydrogenated C36 dimer acid.

Suitable polyhydric alcohols for this alternative polyester are the same as the polyhydric alcohols noted above for the polyester, including the isosorbide. Also, for the alternative polyester, the weight average molecular weight of the polyester is at least 8000 Daltons, as determined by ASTM D5296-05. More preferably, the polyester has a weight average molecular weight from about 10,000 to about 15,000 Daltons, as determined by ASTM D5296-05.

The polyesters, according to the present disclosure, are suitable for use as impact modifiers in polymer compositions. As used herein, an "impact modifier" is an additive used to improve the durability and toughness of a polymer resin, whereby toughness is measured as the area underneath the stress-strain curve of a standard tensile elongation and modulus test. In addition, the toughness of a polymer can be correlated by the testing via a notched Izod test. A polymer exhibiting a higher impact number would indicate increased toughness.

The polyesters, according to the present disclosure, are also preferably biodegradable as determined using ASTM standard D5511. Further, in some embodiments, the polyesters are preferably home compostable as determined using ASTM standard D6868.

The present disclosure also provides a polymer composition that includes a polyester as described. In general, the polymer composition combines the impact modifier polyester with at least one biodegradable polymer selected from the group consisting of poly(lactic acid), poly(hydroxyalkanoates), and mixtures thereof. Typically, the polymer composition includes from about 5 to about 50 weight percent of the impact modifying polyester and from about 50 to about 95 weight percent of the biodegradable polymer selected from the group consisting of poly(lactic acid), poly(hydroxyalkanoates), and mixtures thereof.

The polymer composition more preferably includes from about 60 to about 85 weight percent of the biodegradable polymer and from about 5 to about 30 weight percent of the impact modifying polyester. Still more preferably, the polymer composition includes from about 7.5 to about 15 weight percent of the impact modifying polyester.

Again, the impact modifier used in the polymer composition is a polyester in accordance with the foregoing disclosure. Thus, the impact modifying polyester is made up of: (1) from about 15 to about 40 weight percent monomer repeat units of isosorbide; (2) from about 25 to about 60 weight percent monomer repeat units of a dicarboxylic acid or anhydride; and (3) from about 10 to about 20 weight percent monomer repeat units of a polyhydric alcohol. The impact modifying polyester also has a weight average molecular weight of at least 8000 Daltons, as determined by ASTM D5296-05.

In some instances, the biodegradable polymer preferably includes poly(lactic acid). In other embodiments, the biodegradable polymer preferably includes at least one poly(hydroxyalkanoate). Moreover, in certain embodiments, the biodegradable polymer preferably includes a mixture of poly(lactic acid) and poly(hydroxyalkanoates). For instance, in some embodiments, the polymer composition may include from about 5 to about 25 weight percent of poly(lactic acid) and from about 70 to about 90 weight percent of at least one poly(hydroxyalkanoate), based on the overall weight of the polymer composition.

According to certain embodiments wherein the polymer composition includes a poly(hydroxyalkanoate), the at least one poly(hydroxyalkanoate) is preferably made up of poly-3-hydroxybutyrate-co-3-hydroxyhexanoate ("P(3HB-co-3HHx)").

In some instances, this (3HB-co-3HHx) is preferably made up of from about 75 to about 99 mole percent hydroxybutyrate and from about 1 to about 25 mole percent hydroxyhexanoate. More preferably, the (3HB-co-3HHx) is made up of from about 93 to about 98 mole percent hydroxybutyrate and from about 2 to about 7 mole percent hydroxyhexanoate.

In still other embodiments, the at least one poly(hydroxyalkanoate) may include a terpolymer made up from about 75 to about 99.9 mole percent monomer repeat units of 3-hydroxybutyrate, from about 0.1 to about 25 mole percent monomer repeat units of 3-hydroxyhexanoate, and from about 0.1 to about 25 mole percent monomer repeat units of a third 3-hydoxyalkanoate having from 5 to 12 carbon atoms.

According to certain embodiments the at least one poly(hydroxyalkanoate) preferably has a weight average molecular weight from about 50,000 Daltons to about 2.5 million Daltons, as determined by ASTM D5296-05. More preferably, the at least one poly(hydroxyalkanoate) has a weight average molecular weight from about 500,000 Daltons to about 750,000 Daltons, as determined by ASTM D5296-05.

The polymer composition may also include further additives. For instance, the polymer composition may include a plasticizer, a nucleating agent, and/or a filler. In some embodiments, the polymer compositions may also include from about 1 to about 10 weight percent of at least one plasticizer; from about 0.1 to about 5 weight percent of at least one nucleating agent; and from about 0.1 to about 10 weight percent of a filler.

Suitable nucleating agents for use in the polymer composition may, for example, be selected from the group consisting of pentaerythritol, boron nitride, poly(hydroxybutyrate), inositol, clays, dipentaerythritol, sorbitol, and mixtures thereof.

Suitable fillers for use in the polymer composition may, for example, be selected from the group consisting of aragonite, clays, calcium carbonate, cellulose, nano-cellulose, talc, kaolinite, montmorillonite, bentonite, silica, chitin, starches, diatomaceous earth, titanium dioxide, nano clay, mica, and mixtures thereof.

Suitable plasticizers for use in the polymer composition may, for example, be selected from the group consisting of sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly(ethylene) glycols having a number average molecular weight of 400-10,000 g/mol, esters of vegetable oils, long-chain alkyl acids, adipates, glycerol, isosorbide derivatives or mixtures thereof., HALLGREEN IM-8830 ester, HALLGREEN R-8010 ester, polyhydroxyalkanoate copolymers comprising at least 18 mole percent monomer repeat units of hydroxyalkanoates other than hydroxybutyrate and mixtures thereof.

Moreover, in certain embodiments, the polymer composition may also include an additional biodegradable polymer besides poly(lactic acid) and/or poly(hydroxyalkanoates). Thus, in certain embodiments, the polymer composition may also include comprising from about 5 to about 50 weight percent of at least one biodegradable polymer selected from the group consisting of poly(caprolactone), poly(ethylene sebacate), poly(butylene succinate), poly(butylene succinate-co-adipate), poly(butylene adipate terephthalate), poly(vinyl acetate) and mixtures thereof.

According to certain embodiments, the overall polymer composition is preferably biodegradable as determined using ASTM standard D5988. Further, in some embodiments, the polymer composition is preferably home compostable as determined using ASTM standard D6868.

A variety of end products may be formed from the polymer composition in accordance with the present disclosure. Thus, according to one embodiment, the present disclosure provides a molded sheet made up of the polymer composition. In a second embodiment, the present disclosure provides a molded article made up of the polymer composition, wherein the molded article is formed by thermoforming, injection molding, or blow molding. In another embodiment, the present disclosure provides a film made up of the polymer composition, wherein the film is a blown film or a cast film. In still another embodiment, the present disclosure provides a fiber made up of the polymer composition.

EMBODIMENTS

The present disclosure is also further illustrated by the following embodiments:

Embodiment 1. A polyester comprising: from about 15 to about 40 weight percent monomer repeat units of isosorbide, based on the total weight of the polyester; from about 25 to about 60 weight percent monomer repeat units of a dicarboxylic acid or anhydride, based on the total weight of the polyester; and from about 10 to about 20 weight percent monomer repeat units of a polyhydric alcohol, based on the total weight of the polyester, wherein the polyester has a weight average molecular weight of at least 8000 Daltons, as determined by ASTM D5296-05.

Embodiment 2. The polyester of Embodiment 1, wherein the dicarboxylic acid or anhydride is selected from the group consisting of succinic acid, succinic anhydride, glutaric acid, pimelic acid, undecanoic acid, dodecanoic acid, dodecanedioic acid, suberic acid, azelaic acid, sebacic acid, adipic acid, phthalic anhydride, dimethyl terephthalate, terephthalic acid, isophthalic acid, 1,8-naphthalic anhydride, 1,8-naphthalic dicarboxylic acid, 1,8-dimethyl naphthalate, dimethyl isophtalate, phthalic acid, pyromellitic anhydride, mellitic anhydride, mellitic acid, trimellitic anhydride, 3,3'4,4'-benzophenone tetracarboxylic anhydride, 3,3'4,4'-benzophenone tetracarboxylic acid, trimellitic acid, nadic anhydride, methyl nadic anhydride, C36 dimer acid, partially hydrogenated C36 dimer acid, polyethylene terephthalate recycled polymer, polybutylene terephthalate recycled polymer, polyethylene terephthalate virgin polymer, polybutylene terephthalate virgin polymer, and mixtures thereof.

Embodiment 3. The polyester of Embodiments 1 or 2, wherein the dicarboxylic acid or anhydride is selected from the group consisting of succinic acid, succinic anhydride, nadic anhydride, methyl nadic anhydride, sebacic acid, C36 dimer acid, partially hydrogenated C36 dimer acid, and mixtures thereof.

Embodiment 4. The polyester of any of the preceding Embodiments, wherein the dicarboxylic acid or anhydride comprises a mixture of (1) succinic acid or succinic anhydride and (2) nadic anhydride, methyl nadic anhydride, C36 dimer acid, or partially hydrogenated C36 dimer acid, and mixtures thereof.

Embodiment 5. The polyester of any of the preceding Embodiments, wherein the polyester comprises from about 25 to about 35 weight percent succinic acid or succinic anhydride and from about 10 to about 25 weight percent nadic anhydride, methyl nadic anhydride, C36 dimer acid, or partially hydrogenated C36 dimer acid.

Embodiment 6. The polyester of any of the preceding Embodiments, wherein the polyhydric alcohol is selected from the group consisting of glycerin, ethylene glycol, diethylene glycol, 1,3-propanediol, 1,4-butanediol, 1,5-pentanediol, 1,6-hexanediol, 2-methyl, neopentyl glycol, propylene glycol, triethylene glycol, tetraethylene glycol, propylene glycol, dipropylene glycol, tripropylene glycol, tetrapropylene glycol, trimethylene glycol, 1,1,1-trimethylol ethane, 1,2,3-trimethylolpropane, methyl propanediol, pentaerythritol, and poly(oxyalkylene) polyols comprising monomer repeat units of ethylene oxide, propylene oxide, or butylene oxide, and mixtures thereof.

Embodiment 7. The polyester of any of the preceding Embodiments, wherein the polyhydric alcohol is selected from the group consisting of 1,3-propanediol, 1,4-butanediol, 1,6-hexanediol, methyl propanediol, and mixtures thereof.

Embodiment 8. The polyester of any of the preceding Embodiments, wherein the polyhydric alcohol comprises 1,3-propanediol.

Embodiment 9. The polyester of any of the preceding Embodiments, wherein the dicarboxylic acid or anhydride comprises succinic acid or anhydride, and the polyhydric alcohol comprises 1,3-propanediol.

Embodiment 10. The polyester of any of the preceding Embodiments, wherein the polyester has a weight average molecular weight from about 10,000 to about 15,000 Daltons, as determined by ASTM D5296-05.

Embodiment 11. A polymer composition comprising: from about 50 to about 95 weight percent of a biodegradable polymer selected from the group consisting of poly(lactic acid), poly(hydroxyalkanoates), and mixtures thereof; and from about 5 to about 50 weight percent of an impact modifying polyester, wherein the impact modifying polyester comprises from about 15 to about 40 weight percent monomer repeat units of isosorbide, based on the total weight of the polyester; from about 25 to about 60 weight percent monomer repeat units of a dicarboxylic acid or anhydride, based on the total weight of the polyester; and from about 10 to about 20 weight percent monomer repeat units of a polyhydric alcohol, based on the total weight of the polyester, wherein the polyester has a weight average molecular weight of at least 8000 Daltons, as determined by ASTM D5296-05.

Embodiment 12. The polymer composition of Embodiment 11, wherein the dicarboxylic acid or anhydride is selected from the group consisting of succinic acid, succinic anhydride, glutaric acid, pimelic acid, undecanoic acid, dodecanoic acid, dodecanedioic acid, suberic acid, azelaic acid, sebacic acid, adipic acid, phthalic anhydride, dimethyl terephthalate, terephthalic acid, isophthalic acid, 1,8-naphthalic anhydride, 1,8-naphthalic dicarboxylic acid, 1,8-dimethyl naphthalate, dimethyl isophtalate, phthalic acid, pyromellitic anhydride, mellitic anhydride, mellitic acid, trimellitic anhydride, 3,3'4,4'-benzophenone tetracarboxylic anhydride, 3,3'4,4'-benzophenone tetracarboxylic acid, trimellitic acid, nadic anhydride, methyl nadic anhydride, C36 dimer acid, partially hydrogenated C36 dimer acid, polyethylene terephthalate recycled polymer, polybutylene terephthalate recycled polymer, polyethylene terephthalate virgin polymer, polybutylene terephthalate virgin polymer, and mixtures thereof.

Embodiment 13. The polymer composition of Embodiments 11 or 12, wherein the dicarboxylic acid or anhydride is selected from the group consisting of succinic acid, succinic anhydride, nadic anhydride, methyl nadic anhydride, sebacic acid, C36 dimer acid, partially hydrogenated C36 dimer acid, and mixtures thereof.

Embodiment 14. The polymer composition of any of Embodiments 11-13, wherein the dicarboxylic acid or anhydride comprises a mixture of (1) succinic acid or succinic anhydride and (2) nadic anhydride, methyl nadic anhydride, C36 dimer acid, or partially hydrogenated C36 dimer acid, and mixtures thereof.

Embodiment 15. The polymer composition of any of Embodiments 11-14, wherein the polyester comprises from about 25 to about 35 weight percent succinic acid or succinic anhydride and from about 10 to about 25 weight percent nadic anhydride, methyl nadic anhydride, C36 dimer acid, or partially hydrogenated C36 dimer acid.

Embodiment 16. The polymer composition of any of Embodiments 11-15, the polyhydric alcohol is selected from the group consisting of glycerin, ethylene glycol, diethylene glycol, 1,3-propanediol, 1,4-butanediol, 1,5-pentanediol, 1,6-hexanediol, 2-methyl, neopentyl glycol, propylene glycol, triethylene glycol, tetraethylene glycol, propylene glycol, dipropylene glycol, tripropylene glycol, tetrapropylene glycol, trimethylene glycol, 1,1,1-trimethylol ethane, 1,2,3-trimethylolpropane, methyl propanediol, pentaerythritol, and poly(oxyalkylene) polyols comprising monomer repeat units of ethylene oxide, propylene oxide, or butylene oxide, and mixtures thereof.

Embodiment 17. The polymer composition of any of Embodiments 11-16, wherein the polyhydric alcohol is selected from the group consisting of 1,3-propanediol, 1,4-butanediol, 1,6-hexanediol, methyl propanediol, and mixtures thereof.

Embodiment 18. The polymer composition of any of Embodiments 11-17, wherein the polyhydric alcohol comprises 1,3-propanediol.

Embodiment 19. The polymer composition of any of Embodiments 11-18, wherein the dicarboxylic acid or anhydride comprises succinic acid or anhydride, and the polyhydric alcohol comprises 1,3-propanediol.

Embodiment 20. The polymer composition of any of Embodiments 11-19, wherein the impact modifying polyester has a weight average molecular weight from about 10,000 to about 15,000 Daltons, as determined by ASTM D5296-05.

Embodiment 21. The polymer composition of any of Embodiments 11-20, wherein the polymer composition comprises from about 60 to about 85 weight percent of the biodegradable polymer and from about 5 to about 30 weight percent of the impact modifying polyester.

Embodiment 22. The polymer composition of any of Embodiments 11-21, wherein the biodegradable polymer comprises poly(lactic acid).

Embodiment 23. The polymer composition of any of Embodiments 11-22, wherein the biodegradable polymer comprises at least one poly(hydroxyalkanoate).

Embodiment 24. The polymer composition of Embodiment 23, wherein the at least one poly(hydroxyalkanoate) comprises poly-3-hydroxybutyrate-co-3-hydroxyhexanoate ("P(3HB-co-3HHx)").

Embodiment 25. The polymer composition of Embodiment 24, wherein the P(3HB-co-3HHx) comprises from about 75 to about 99 mole percent hydroxybutyrate and from about 1 to about 25 mole percent hydroxyhexanoate.

Embodiment 26. The polymer composition of Embodiment 24, wherein the P(3HB-co-3HHx) comprises from about 93 to about 98 mole percent hydroxybutyrate and from about 2 to about 7 mole percent hydroxyhexanoate.

Embodiment 27. The polymer composition of Embodiment 23, wherein the at least one poly(hydroxyalkanoate) comprises a terpolymer made up from about 75 to about 99.9 mole percent monomer repeat units of 3-hydroxybutyrate, from about 0.1 to about 25 mole percent monomer repeat units of 3-hydroxyhexanoate, and from about 0.1 to about 25 mole percent monomer repeat units of a third 3-hydoxyalkanoate having from 5 to 12 carbon atoms.

Embodiment 28. The polymer composition of Embodiment 23, wherein the at least one poly(hydroxyalkanoate) has a weight average molecular weight from about 50,000 Daltons to about 2.5 million Daltons, as determined by ASTM D5296-05.

Embodiment 29. The polymer composition of Embodiment 23, wherein the at least one poly(hydroxyalkanoate) has a weight average molecular weight from about 500,000 Daltons to about 750,000 Daltons, as determined by ASTM D5296-05.

Embodiment 30. The polymer composition of any of Embodiments 11-29, wherein the polymer composition comprises from about 5 to about 25 weight percent of poly(lactic acid) and from about 70 to about 90 weight percent of at least one poly(hydroxyalkanoate).

Embodiment 31. The polymer composition of any of Embodiments 11-30, further comprising
from about 1 to about 10 weight percent of at least one plasticizer;
from about 0.1 to about 5 weight percent of at least one nucleating agent; and
from about 0.1 to about 10 weight percent of a filler.

Embodiment 32. The polymer composition of any of Embodiments 11-31, wherein the polymer composition is biodegradable as determined using ASTM standard D5988.

Embodiment 33. The polymer composition of any of Embodiments 11-32, wherein the polymer composition is home compostable as determined using ASTM standard D6868.

Embodiment 34. The polymer composition of any of Embodiments 11-33, further comprising from about 5 to about 50 weight percent of at least one biodegradable polymer selected from the group consisting of poly(caprolactone), poly(ethylene sebacate), poly(butylene succinate), poly(butylene succinate-co-adipate), poly(butylene adipate terephthalate), poly(vinyl acetate) and mixtures thereof.

Embodiment 35. A molded sheet comprising the polymer composition of any of Embodiments 11-34.

Embodiment 36. A molded article comprising the polymer composition of any of Embodiments 11-34, wherein the molded article is formed by thermoforming, injection molding, or blow molding.

Embodiment 37. A film comprising the polymer composition of any of Embodiments 11-34, wherein the film is a blown film or a cast film.

Embodiment 38. A fiber comprising the polymer composition of any of Embodiments 11-34.

EXAMPLES

The following non-limiting examples illustrate various additional aspects of the invention. Unless otherwise indicated, temperatures are in degrees Celsius and percentages are by weight based on the dry weight of the formulation.

Example 1

To a reaction flask equipped with a nitrogen inlet and vacuum capability, 800 grams of isosorbide and 5 grams of phosphorous acid were charged. The reaction temperature was raised to 100° C., and three vacuum cycles were performed by pulling the contents of the flask to maximum vacuum and then releasing the vacuum with an inert gas such as nitrogen. Subsequently, 1279 grams of succinic acid was charged, and one more vacuum cycle was performed. Next, the reactor temperature was raised to a maximum of 220° C., all the while distilling water over into a receiver.

Once water evolution slowed, 416 grams of propanediol was charged to the reactor. Again, the temperature was slowly raised to a maximum of 210° C. Towards the end of the reaction, 1 gram of tin (II) ethyl hexanoate was added, and a vacuum was applied. The material was held until appropriate molecular weight specifications were obtained.

Example 2

To a 1514 L stainless steel reactor equipped with a nitrogen inlet and vacuum capability, 416 kg of isosorbide and 2.27 kg of phosphorous acid were charged. The reaction temperature was raised to 100° C., and three vacuum cycles were performed by pulling the contents of the reactor to maximum vacuum and then releasing the vacuum with an inert gas such as nitrogen. Subsequently, 590 kg of succinic acid was charged, and one more vacuum cycle was performed. Next, the reactor temperature was raised to a maximum of 220° C., all the while distilling water over into a receiver. Once water evolution slowed, 216 kg of propanediol was charged to the reactor. Again, the temperature was slowly raised to a maximum of 210° C. Towards the end of the reaction, 453 grams of tin (II) ethyl hexanoate was added. The material was held until appropriate molecular weight specifications were obtained.

Example 3

To a reaction flask equipped with a nitrogen inlet and vacuum capability, 575 grams of isosorbide, 888 grams of a partially hydrogenated, distilled dimer acid, and 5 grams of phosphorous acid were charged. The reaction temperature was raised to 100° C., and three vacuum cycles were performed by pulling the contents of the flask to maximum vacuum and then releasing the vacuum with an inert gas such as nitrogen. Subsequently, 733 grams of succinic acid was charged, and one more vacuum cycle was performed. Next, the reactor temperature was raised to a maximum of 220° C., all the while distilling water over into a receiver. Once water evolution slowed, 299 grams of propanediol was charged to the reactor. Again, the temperature was slowly raised to a maximum of 220° C. Towards the end of the reaction, 1 gram of tin(II) ethyl hexanoate was added, and a vacuum was applied. The material was held until appropriate molecular weight specifications were obtained.

Example 4

To a reaction flask equipped with a nitrogen inlet and vacuum capability, 2314 grams of the polyester from Example 2 and 186 grams of methyl nadic anhydride were charged. The reactor temperature was raised to a maximum of 220° C., all the while distilling water over into a receiver. Towards the end of the reaction, 0.63 grams of tin(II) ethyl hexanoate was added. The material was held until appropriate molecular weight specifications were obtained.

Example 5

To a reaction flask equipped with a nitrogen inlet and vacuum capability, 1124 grams of 1,6 hexanediol, 548 grams of succinic acid, and 827 grams of methyl nadic anhydride were charged. Next, the reactor temperature was raised to a maximum of 210° C., all the while distilling water over into a receiver. Towards the end of the reaction, 0.63 grams of tin(II) ethyl hexanoate was added. The material was held until appropriate molecular weight specifications were obtained Example 6

To a reaction flask equipped with a nitrogen inlet and vacuum capability, 1155 grams of 1,6 hexanediol, 563 grams of succinic acid, and 783 grams of nadic anhydride were charged. Next, the reactor temperature was raised to a maximum of 210° C., all the while distilling water over into a receiver. Towards the end of the reaction, 0.63 grams of tin(II) ethyl hexanoate was added. The material was held until appropriate molecular weight specifications were obtained.

Example 7

To a reaction flask equipped with a nitrogen inlet and vacuum capability, 1191 grams of 1,6 hexanediol, 871 grams of succinic acid, and 438 grams of methyl nadic anhydride were charged. Next, the reactor temperature was raised to a maximum of 210° C., all the while distilling water over into a receiver. Towards the end of the reaction, 0.63 grams of tin(II) ethyl hexanoate was added. The material was held until appropriate molecular weight specifications were obtained.

Examples 8-20

In each of these Examples, a polymer composition was prepared, incorporating one of the impact modifier polyesters of Examples 1-7. The polymer composition was extruded on a 27 mm twin-screw Entek extruder. In Examples 8-15, 19, and 20, a sample of the extruded material was tested for tensile strength and elongation using an Instron 34TM-10 in accordance with ATSM D638 (Type I Specimen). Impact strength testing was carried out in accordance with ATSM D256 (Test Method A) using an Instron 9050 tester. In Examples 16-18, a sample of the extruded material was tested for resilience in accordance with ASTM D4812-19, using a Instron CEAST 9050 Pendulum Impact System testing apparatus.

For each example, a control sample was also prepared, extruded, and tested similarly to the test sample. In each example, the composition of the control sample was the same as the tested sample, except the impact modifier polyester was omitted from the polymer composition.

Example 8

To a 27 mm extruder, 2.27 kg of the reaction product of Example 1 was added to 42.5 kg of PHA, 453 grams of pentaerythritol, and 172 grams of Joncryl 4468 and ran through the extruder. The plastic was tested and exhibited a tensile strength of 26379 kPa (versus the control 24097 kPa); an elongation of 8.9% (versus a control of 10.6%), and an impact strength of 0.344 J/cm (versus a control of 0.288 J/cm)

Example 9

To a 27 mm extruder, 4.53 kg of the reaction product of Example 1 was added to 40 kg of PHA, 453 grams of pentaerythritol, and 340 grams of Joncryl 4468 and ran through the extruder. The plastic was tested and exhibited a tensile strength of 24242 kPa (versus the control 24097 kPa); an elongation of 11.3% (versus a control of 10.6%), and an impact strength of 0.408 J/cm (versus a control of 0.288 J/cm)

Example 10

To a 27 mm extruder, 4.5 kg of the reaction product of Example 1 was added to 40 kg of PHA, 317 grams of Joncryl 4468, and 453 grams of pentaerythritol and ran through the extruder. The plastic was tested and exhibited a tensile strength of 19981 kPa (versus the control 27303 kPa); an elongation of 2.2% (versus a control of 9.3%), and an impact strength of 0.259 J/cm (versus a control of 0.301 J/cm)

Example 11

To a 27 mm extruder, 6.8 kg of the reaction product of Example 1 was added to 37.6 kg of PHA, 498 grams of Joncryl 4468, and 453 grams of pentaerythritol and ran through the extruder. The plastic was tested and exhibited a tensile strength of 26745 kPa (versus the control 27303 kPa); an elongation of 11.5% (versus a control of 9.3%), and an impact strength of 0.256 J/cm (versus a control of 0.301 J/cm)

Example 12

To a 27 mm extruder, 4.53 kg of the reaction product of Example 1 was added to 40.6 kg of PHA and 227 kg of boron nitride and ran through the extruder. The plastic was tested and exhibited a tensile strength of 19960 kPa (versus the control 24097 kPa); an elongation of 11.8% (versus a control of 10.6%), and an impact strength of 0.232 J/cm (versus a control of 0.288 J/cm)

Example 13

To a 27 mm extruder, 2.27 kg of the reaction product of Example 6 was added to 42.9 kg of PHA and 227 grams of Boron nitride and ran through the extruder. The plastic was tested and exhibited a tensile strength of 16899 kPa (versus the control 24097 kPa); an elongation of 15.5% (versus a control of 10.6%), and an impact strength of 0.275 J/cm (versus a control of 0.288 J/cm)

Example 14

To a 27 mm extruder, 4.53 kg of the reaction product of Example 6 was added to 40.6 kg of PHA and 227 grams of boron nitride and ran through the extruder. The plastic was tested and exhibited a tensile strength of 12941 kPa (versus the control 24097 kPa); an elongation of 16.6% (versus a control of 10.6%), and an impact strength of 0.324 J/cm (versus a control of 0.288 J/cm)

Example 15

To a 27 mm extruder, 4.53 kg of the reaction product of Example 5 was added to 40.6 kg of PHA and 277 grams of boron nitride and ran through the extruder. The plastic was tested and exhibited a tensile strength of 19167 kPa (versus the control 24097 kPa); an elongation of 18.4% (versus a control of 10.6%), and an impact strength of 0.277 J/cm (versus a control of 0.288 J/cm)

Example 16

To a 27 mm extruder, 2.27 kg of the reaction product of Example 6 was added to 42.87 kg of PHA and 227 grams of boron nitride and ran through the extruder. The plastic was tested and exhibited a resilience of 66.9 kJ/m$^2$ versus the control of 14.5 kJ/m$^2$ Example 17

To a 27 mm extruder, 4.53 kg of the reaction product of Example 6 was added to 40.6 kg of PHA and 227 grams of boron nitride and ran through the extruder. The plastic was tested and exhibited a resilience of 67.1 kJ/m$^2$ versus the control of 14.5 kJ/m$^2$ Example 18

To a 27 mm extruder, 4.53 kg of the reaction product of Example 7 was added to 40.6 kg of PHA and 227 grams of boron nitride and ran through the extruder. The plastic was tested and exhibited a resilience of 39.5 kJ/m$^2$ versus the control of 14.5 kJ/m$^2$ Example 19

To a 27 mm extruder, 4.53 kg of the reaction product of Example 4 was added to 40.6 kg of PHA and 227 grams of boron nitride and ran through the extruder. The plastic was tested and exhibited a resilience of 11.1 kJ/m$^2$ versus the control of 2.34 kJ/m$^2$.

Example 20

To a 27 mm extruder, 1.36 kg of the reaction product of Example 3 was added to 44 kg of PHA and ran through the extruder. The plastic was tested and exhibited a tensile strength of 1386 kPa versus a control of 1572 kPa, an elongation of 5.3% versus a control of 5.6%, and an impact strength of 0.167 J/cm versus the control of 0.301 J/cm.

From the foregoing, it may be seen that the impact modifying polyesters according to the present disclosure can provide a broad variety of mechanical property improvements to a bio-plastic system. For instance, a fourfold increase in impact strength or an 11% increase in elongation may be achieved without a corresponding loss of tensile strength. Thus, the impact modifying polyesters of the present disclosure allow for the mechanical properties of a bio-plastic system to be tailored to a particular end use application.

The foregoing description of preferred embodiments for this invention has been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A polyester comprising:
    from about 15 to about 40 weight percent monomer repeat units of isosorbide, based on the total weight of the polyester;

from about 25 to about 60 weight percent monomer repeat units of a dicarboxylic acid or anhydride, based on the total weight of the polyester; and from about 10 to about 20 weight percent monomer repeat units of a polyhydric alcohol, based on the total weight of the polyester, wherein the polyester has a weight average molecular weight of at least 8000 Daltons, as determined by ASTM D5296-05 and wherein the dicarboxylic acid or anhydride comprises a mixture of (1) succinic acid or succinic anhydride and (2) nadic anhydride, methyl nadic anhydride, C36 dimer acid, or partially hydrogenated C36 dimer acid, and mixtures thereof.

2. The polyester of claim 1, wherein the polyester comprises from about 25 to about 35 weight percent succinic acid or succinic anhydride and from about 10 to about 25 weight percent nadic anhydride, methyl nadic anhydride, C36 dimer acid, or partially hydrogenated C36 dimer acid.

3. The polyester of claim 1, wherein the polyhydric alcohol is selected from the group consisting of glycerin, ethylene glycol, diethylene glycol, 1,3-propanediol, 1,4-butanediol, 1,5-pentanediol, 1,6-hexanediol, 2-methyl, neopentyl glycol, propylene glycol, triethylene glycol, tetraethylene glycol, propylene glycol, dipropylene glycol, tripropylene glycol, tetrapropylene glycol, trimethylene glycol, 1,1,1-trim ethylol ethane, 1,2,3-trimethylolpropane, methyl propanediol, pentaerythritol, and poly(oxyalkylene) polyols comprising monomer repeat units of ethylene oxide, propylene oxide, or butylene oxide, and mixtures thereof.

4. The polyester of claim 1, wherein the polyhydric alcohol is selected from the group consisting of 1,3-propanediol, 1,4-butanediol, 1,6-hexanediol, methyl propanediol, and mixtures thereof.

5. The polyester of claim 1, wherein the polyhydric alcohol comprises 1,3-propanediol.

6. The polyester of claim 1, wherein the polyester has a weight average molecular weight from about 10,000 to about 15,000 Daltons, as determined by ASTM D5296-05.

7. A polymer composition comprising:
from about 50 to about 95 weight percent of a biodegradable polymer selected from the group consisting of poly(lactic acid), poly(hydroxyalkanoates), and mixtures thereof; and
from about 5 to about 50 weight percent of an impact modifying polyester, wherein the impact modifying polyester comprises
from about 15 to about 40 weight percent monomer repeat units of isosorbide, based on the total weight of the polyester;
from about 25 to about 60 weight percent monomer repeat units of a dicarboxylic acid or anhydride, based on the total weight of the polyester; and
from about 10 to about 20 weight percent monomer repeat units of a polyhydric alcohol, based on the total weight of the polyester,
wherein the polyester has a weight average molecular weight of at least 8000 Daltons, as determined by ASTM D5296-05 and
wherein the dicarboxylic acid or anhydride comprises a mixture of (1) succinic acid or succinic anhydride and (2) nadic anhydride, methyl nadic anhydride, C36 dimer acid, or partially hydrogenated C36 dimer acid, and mixtures thereof.

8. The polymer composition of claim 7, wherein the polyester comprises from about 25 to about 35 weight percent succinic acid or succinic anhydride and from about 10 to about 25 weight percent nadic anhydride, methyl nadic anhydride, C36 dimer acid, or partially hydrogenated C36 dimer acid.

9. The polymer composition of claim 7, the polyhydric alcohol is selected from the group consisting of glycerin, ethylene glycol, diethylene glycol, 1,3-propanediol, 1,4-butanediol, 1,5-pentanediol, 1,6-hexanediol, 2-methyl, neopentyl glycol, propylene glycol, triethylene glycol, tetraethylene glycol, propylene glycol, dipropylene glycol, tripropylene glycol, tetrapropylene glycol, trimethylene glycol, 1,1,1-trim ethylol ethane, 1,2,3-trimethylolpropane, methyl propanediol, pentaerythritol, and poly(oxyalkylene) polyols comprising monomer repeat units of ethylene oxide, propylene oxide, or butylene oxide, and mixtures thereof.

10. The polymer composition of claim 7, wherein the polyhydric alcohol is selected from the group consisting of 1,3-propanediol, 1,4-butanediol, 1,6-hexanediol, methyl propanediol, and mixtures thereof.

11. The polymer composition of claim 7, wherein the polyhydric alcohol comprises 1,3-propanediol.

12. The polymer composition of claim 7, wherein the impact modifying polyester has a weight average molecular weight from about 10,000 to about 15,000 Daltons, as determined by ASTM D5296-05.

13. The polymer composition of claim 7, wherein the polymer composition comprises from about 60 to about 85 weight percent of the biodegradable polymer and from about 5 to about 30 weight percent of the impact modifying polyester.

14. The polymer composition of claim 7, wherein the biodegradable polymer comprises poly(lactic acid).

15. The polymer composition of claim 7, wherein the biodegradable polymer comprises at least one poly(hydroxyalkanoate).

16. The polymer composition of claim 15, wherein the at least one poly(hydroxyalkanoate) comprises poly-3-hydroxybutyrate-co-3-hydroxyhexanoate ("P(3HB-co-3HHx)").

17. The polymer composition of claim 16, wherein the P(3HB-co-3HHx) comprises from about 75 to about 99 mole percent hydroxybutyrate and from about 1 to about 25 mole percent hydroxyhexanoate.

18. The polymer composition of claim 16, wherein the P(3HB-co-3HHx) comprises from about 93 to about 98 mole percent hydroxybutyrate and from about 2 to about 7 mole percent hydroxyhexanoate.

19. The polymer composition of claim 15, wherein the at least one poly(hydroxyalkanoate) comprises a terpolymer made up from about 75 to about 99.9 mole percent monomer repeat units of 3-hydroxybutyrate, from about 0.1 to about 25 mole percent monomer repeat units of 3-hydroxyhexanoate, and from about 0.1 to about 25 mole percent monomer repeat units of a third 3-hydoxyalkanoate having from 5 to 12 carbon atoms.

20. The polymer composition of claim 15, wherein the at least one poly(hydroxyalkanoate) has a weight average molecular weight from about 50,000 Daltons to about 2.5 million Daltons, as determined by ASTM D5296-05.

21. The polymer composition of claim 15, wherein the at least one poly(hydroxyalkanoate) has a weight average molecular weight from about 500,000 Daltons to about 750,000 Daltons, as determined by ASTM D5296-05.

22. The polymer composition of claim 7, wherein the polymer composition comprises from about 5 to about 25 weight percent of poly(lactic acid) and from about 70 to about 90 weight percent of at least one poly(hydroxyalkanoate), based on the overall weight of the polymer composition.

23. The polymer composition of claim 7, further comprising
from about 1 to about 10 weight percent of at least one plasticizer;
from about 0.1 to about 5 weight percent of at least one nucleating agent; and
from about 0.1 to about 10 weight percent of a filler.

24. The polymer composition of claim 7, wherein the polymer composition is biodegradable as determined using ASTM standard D5988.

25. The polymer composition of claim 7, wherein the polymer composition is home compostable as determined using ASTM standard D6868.

26. The polymer composition of claim 7 further comprising from about 5 to about 50 weight percent of at least one biodegradable polymer selected from the group consisting of poly(caprolactone), poly(ethylene sebacate), poly(butylene succinate), poly(butylene succinate-co-adipate), poly(butylene adipate terephthalate), poly(vinyl acetate) and mixtures thereof.

27. A molded sheet comprising the polymer composition of claim 7.

28. A molded article comprising the polymer composition of claim 7, wherein the molded article is formed by thermoforming, injection molding, or blow molding.

29. A film comprising the polymer composition of claim 7, wherein the film is a blown film or a cast film.

30. A fiber comprising the polymer composition of claim 7.

* * * * *